US00RE33818E

United States Patent [19]

Crowther, Jr. deceased et al.

[11] E Patent Number: Re. 33,818

[45] Reissued Date of Patent: Feb. 11, 1992

[54] AXIALLY SHAPED CHANNEL AND INTEGRAL FLOW TRIPPERS

[75] Inventors: Russell L. Crowther, Jr. deceased, late of Saratoga, by Cosette M. Crowther, Russell L. Crowther,III, Eric J. Crowther, heirs; Eric B. Johansson; Bruce Matzner, both of San Jose, all of Calif.

[73] Assignee: General Electric Company, San Jose, Calif.

[21] Appl. No.: 534,812

[22] Filed: Jun. 6, 1990

Related U.S. Patent Documents

Reissue of:

[64] Patent No.: 4,749,543
Issued: Jun. 7, 1988
Appl. No.: 29,508
Filed: Mar. 24, 1987

[51] Int. Cl.[5] ..... G21C 3/34

[52] U.S. Cl. ..... 376/443; 376/439; 376/444; 376/448

[58] Field of Search ..... 376/443, 439, 444, 448, 376/438, 434, 457

[56] References Cited

U.S. PATENT DOCUMENTS 3,689,358 9/1972 Smith ..... 376/444
3,697,376 10/1972 Mefford ..... 376/434
3,715,274 2/1973 Venier ..... 376/434
4,306,938 12/1981 Yamanaka ..... 376/448
4,749,544 6/1988 Crowther ..... 376/443

FOREIGN PATENT DOCUMENTS 57-175286 4/1981 Japan .
79088787 10/1979 Sweden .

*Primary Examiner*—Donald P. Walsh
*Attorney, Agent, or Firm*—R. R. Schroeder

[57] ABSTRACT

An improved channel is disclosed which has a reduced average thickness in its upper portion. The lesser average thickness corresponds to a lower pressure difference acting on the channel sides, over the upper portion of the channel. The reduction in average thickness is accomplished by cutting flow trippers into the inner surface of the channel walls and/or cutting grooves into the outer surface of the channel. The axial variation of channel average thickness increases water volume adjacent to the upper part of the channel to provide increased neutron moderation, to minimize the steam void reactivity coefficient, and to provide a greater cold shutdown margin. The material removed to produce the flow trippers increases the cross-sectional area inside the channel and reduces pressure drop in the upper portion of the channel. The flow trippers divert water flowing on the channel walls to the fuel rods adjacent to the channel walls, permitting higher reactor power operation. The flow trippers also permit operation at lower flow rates.

14 Claims, 9 Drawing Sheets

AXIALLY SHAPED CHANNEL AND INTEGRAL FLOW TRIPPERS

Matter enclosed in heavy brackets [ ] appears in the original patent but forms no part of this reissue specification; matter printed in italics indicates the additions made by reissue.

*This application is a reissue of application Ser. No. 29,508, filed Mar. 24, 1987, now U.S. Pat. No. 4,749,543 issued on June 7, 1988.*

BACKGROUND OF THE INVENTION

This invention relates to channels for use with fuel bundles in nuclear reactors. More particularly, a flow channel tapered from more material in its cross section at the bottom to a thinner cross section at the top is disclosed. The channel can include integral flow trippers preferably co-acting with the disclosed taper for optimizing thermal performance.

SUMMARY OF THE PRIOR ART

A boiling water reactor when charged with a fuel load has fissionable materials placed therein capable of releasing a finite number of neutrons. It is known in the prior art to avoid parasitic neutron absorption.

Simply stated, neutrons are released from fission at high speed, moderated by the water to a low speed where the neutrons can produce a chain reaction of fission events. The metal channels used within such reactors parasitically absorb neutrons.

Reactor control occurs typically on the exterior of such channels. In order to have optimum nuclear reactor control, the channels are formed with flat sides. These flat sides conform to the shapes of the control rods.

The channels also have a purpose of confining water to a predictable flow path around steam generating rods. Steam is generated in the interior of such channels.

Unfortunately, and to assure predictable water flow in the reactor, there is a pressure differential between the inside and the outside of the channels.

Regarding the inside of the channel, the channel communicates to a water supply chamber through a support plate, a nose piece, and lower tie-plate. The channel extends from the nose piece and lower tie-plate upwardly to and toward an upper core grid. Water flows inside the channel about fuel rods and generates steam.

The outside of the channel constitutes a different pressure environment. Typically, water is diverted at the bottom of the channel to the interstices between the respective channels. This water is at a lower pressure.

The planar channel walls are connected by corners and tend to bulge responsive to pressure differential. This tendency to bulge is additionally aggravated by thermal effects and also by radiation.

To minimize parasitic absorption, such channels are typically fabricated from a metal alloy known as Zircaloy and are heat treated to avoid corrosion and distortion in the reactor environment. Zircaloy is an alloy of Zirconium with small amounts of iron, tin and other alloy metals.

In the prior art, such channels have been constructed of a uniform thickness and have been provided with sufficient metal to withstand the pressure differentials. Said channels are fabricated by bending two sheet sections in U-shaped halves and by welding the two halves together.

Reinforcement of such channels is known. However, reinforcement has been confined to that portion of the channel adjacent the nose piece and the lower tie-plate for the fuel rods in the channel. Reinforcement of the channels has heretofore not been associated with the need for less neutron absorption and less displacement of neutron moderator. For example, see Venier et al. U.S. Pat. No. 3,715,274 and Mefford et al. U.S. Pat. No. 3,697,376.

The coolant flow inside a channel consists of a mixture of steam and water, with a layer of water on the inner surface of the channel, and a layer of water on the surface of each fuel rod. At the bottom of the channel there is no steam; water fills the entire region between fuel rods, inside the channel. Moving up the channel, steam generated by the fuel rods fills an increasing fraction of the available space. The thickness of the water layer on the fuel rods decreases. If the water thickness becomes too small on the fuel rods, overheating and thermal instabilities can occur. Water also flows in a layer on the inside of the channel surrounding the fuel bundles. However, unlike the fuel rods, the channel is unheated and, consequently, the water layer on the inside of the channel remains thick and is relatively independent of bundle power, flow rate into the bundle, and height in the channel.

It has been suggested in the prior art to incorporate flow trippers on the inside of the channels to divert water flowing on the channel walls to the fuel rods. Unfortunately, such trippers have heretofore interfered with the insertion of fuel bundles and have increased channel pressure drop. They have consisted of protrusions out from and additions to the inner channel walls.

Because of the effects of two phase steam/water flow on pressure drop, the pressure drop inside the channel is greatest near the top of the channel where the steam voids are greatest. The coupled nuclear-thermal-hydraulic stability of the reactor is affected by the ratio of the two phase-to-single phase pressure drop and the stability improves as the ratio of two phase-to-single phase pressure drop is decreased, Increasing the flow area inside the channel near the top reduces two phase pressure drop and improves coupled nuclear-thermal-hydraulic stability.

Modern high power density reactors include their own specialized problems. Variable flow-rates are used to control the reactor. To improve fuel cycle economics, low flow rates are used during the early part of an operating cycle between refuelings, and high flow rates are used near the end of an operating cycle. At low flow rates the thickness of the water layer on the fuel rods is reduced, and this limits the amount that the flow can be reduced to improve fuel cycle economics.

Furthermore, modern reactor designs have maximum thermal neutron flux and maximum local power peaking in the fuel rods adjacent to the channel walls. Flow trippers when utilized have their greatest effect on these rods.

Reactors typically have less water and more steam in the upper portion of fuel bundles than in the bottom. This difference in water content causes the reactor power to peak toward the bottom of the reactor. During cold shutdown conditions the top of the reactor is most reactive as a result of lower fuel burnup and greater plutonium production in the high steam void regions at the top during power operation. The power peaking to the bottom of the reactor at power and the flux peaking to the top of the reactor during cold shutdown conditions can be improved by reducing structural material in the upper portion of the channel.

SUMMARY OF THE INVENTION

Two improved channel features are disclosed. The first feature is a reduced average channel thickness in the upper portion. The lesser average thickness is allowable because of a lower pressure difference acting on the channel sides, over the upper portion of the channel. This reduction in average thickness increases water volume adjacent to the upper part of the channel to provide increased neutron moderation, to minimize the steam void reactivity coefficient, to flatten the axial power distribution and to provide a greater cold shutdown reactivity margin. If the reduction in thickness is used to increase the flow area inside the channel, the two phase pressure drop decreases.

The second channel feature consists of flow trippers cut in the interior of the channel walls. The flow trippers divert water flowing on the channel walls to the fuel rods adjacent to the channel walls, permitting higher fuel bundle power operation or operation with reduced coolant flow rates. The material removed to produce the flow trippers increases the cross-sectional area for flow inside the channel and reduces the pressure drop.

The flow trippers would be used in the upper part of the channel; there is no need to divert water onto the fuel rods in the lower part of the channel. The flow trippers will contribute to the decreased average channel thickness in the upper part of the channel.

Other Objects and Advantages of this Invention

An object of this invention is to disclose a channel with an axially varying average wall thickness. The channel average wall thickness tapers from a thick cross section at the bottom of the reactor where there is a relatively high pressure differential to a thin cross section at the top of the reactor where there is a low pressure differential.

An advantage of this configuration of the channel is that it optimally places higher water density at the top of the reactor. This higher water density at full power enables more neutron moderation and therefore optimal fission distribution in the fuel rod bundle.

Yet another object of this invention is to disclose a fuel channel with a side wall which has an average inside dimension that increases to and towards the top of the channel.

An advantage of this aspect of the invention is that a fuel channel having an increased cross section at the top and inside is disclosed. This increased cross section at the top and inside reduces pressure drop in the two phase steam/water coolant flow.

Another object of this invention is to disclose a fuel channel with flow trippers. Transverse grooves are cut into the inner walls of the channel. These flow tripper grooves take layers of water flowing on the inside surface of the cool channel and trip the water towards the hot fuel rods. The water as tripped toward the rods removes water from the unheated channel where it is not needed, and diverts it to the hot fuel rods to increase power generation capability of the fuel bundle. At the same time, the desired taper in average channel thickness occurs as a result of removing material from the channel wall to create the flow trippers.

An additional object of this invention is to use the flow trippers for the synergistic purpose of providing the desired axial variation in average wall thickness.

In the prior art, flow trippers have been used in nonnuclear applications. The flow trippers have had the form of strips protruding outward from the inner channel surfaces. Such flow trippers have not been used with channels surrounding nuclear fuel bundles for three reasons: (1) The protruding material absorbs neutrons, decreasing the reactor efficiency, (2) the protruding material reduces the cross sectional area available for coolant flow, increasing pressure drop through the fuel bundle, and (3) the protruding material interferes with insertion of the bundle of fuel rods into the channel.

With this invention the flow trippers are formed by removing material from the inside of the channel wall, and the three disadvantages of prior art flow trippers are avoided. Material is removed instead of added, reducing neutron parasitic capture; the cross-sectional area for coolant flow is increased; and there is no interference for insertion of the fuel rods into the channel.

An additional advantage of this invention is that flow trippers are most effective at low flow rates. As noted earlier, modern reactor designs utilize a wide range of flow rates to improve the reactor efficiency. Thinning of the water layer on the fuel rods at low flow limits the power level at low flow and limits the flow range. Use of flow trippers permits a greater range of flow rates.

BRIEF DESCRIPTION OF THE DRAWINGS

Other objects, features, and advantages of the disclosed invention will become more apparent after referring to the following specification and attached drawings in which:

In FIG. 7 the axial variation in average wall thickness is achieved by a closer spacing of the grooves at the top; in FIG. 7A the axial variation is achieved by using wider grooves in the top of the channel.

In FIG. 8 the axial variation in wall thickness is obtained by using wider grooves at the top of the channel. Deeper grooves can also be used at the top of the channel.

GENERAL DESCRIPTION

The following general description of a reactor is taken from Venier et al. U.S. Pat. No. 3,715,274 and is applicable to this disclosure.

Figure 1:
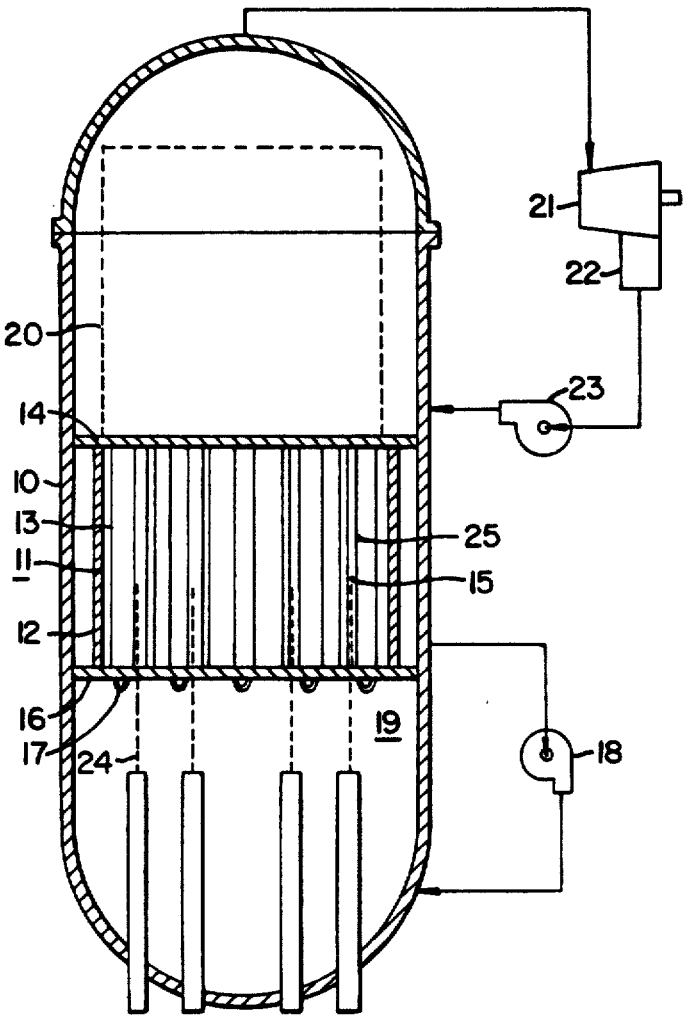
FIG. 1 is a schematic of a reactor in which the invention is installed.

The invention is described herein in connection with a water cooled and moderated nuclear reactor, an example of which is illustrated in FIG. 1. Such a reactor system includes a pressure vessel 10 containing a nuclear chain reactor core 11 submersed in a coolant such as light water. The core 11 is surrounded by an annular shroud 12. The core 11 includes a plurality of replaceable fuel assemblies 13 arranged in spaced relation and supported in the vessel 10 between an upper core grid 14 and a lower core support plate 16. Each fuel assembly includes a nose piece 17 which engages a support socket in the support plate 16. The end of the nose piece projects through the support plate 16 and is formed with openings or communication with a coolant supply chamber 19. A circulation pump 18 pressurizes the coolant in the supply chamber 19 from which the coolant is forced through the openings in the nose pieces 17 upward through the fuel assemblies. A part of the coolant is thereby converted to steam which passes through a separator-dryer arrangement 20 to a utilization device such as a turbine 21. Condensate formed in a condenser 22 is returned as feedwater to the vessel 10 by a pump 23. A plurality of control rods 24 are selectively insertable about the fuel assemblies 13 for control of the reactivity of the core. A plurality of instrumentation receptacles 15 are positioned among the fuel assemblies to contain neutron detectors of monitoring the power level of the core.

Figure 2:
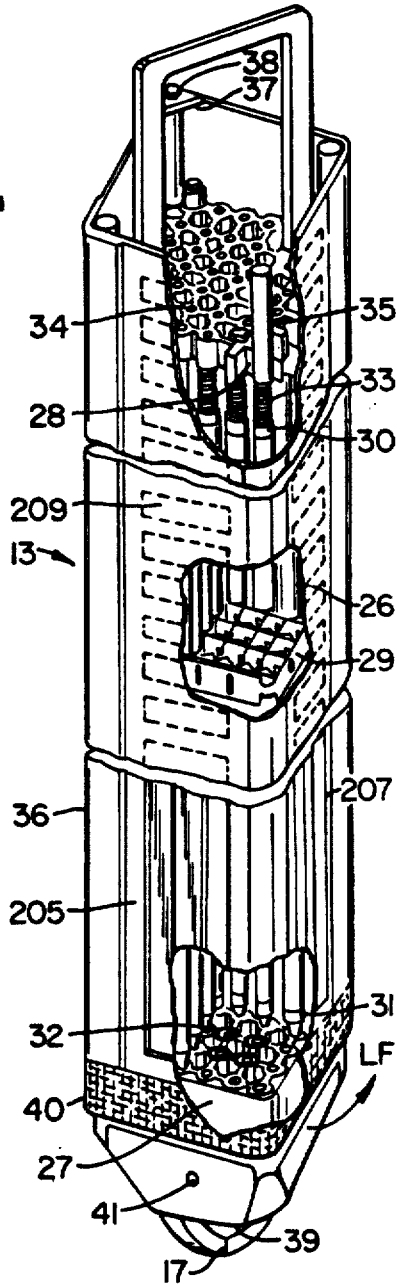
FIG. 2 is a perspective view of a fuel rod bundle and improved channel illustrating the preferred embodiment of flow tripping grooves on the inside in the upper part of the channel, and longitudinal grooves on the outside, over the lower part of the channel.

Illustrated in FIG. 2 is a fuel assembly 13 comprising a plurality of elongated fuel rods 26 supported between a lower tie-plate 27 and an upper tie-plate 28. The fuel rods 26 pass through a plurality of fuel rod spacers 29 which provide intermediate support to retain the elongated rods in spaced relation and restrain them from lateral vibration.

Each of the fuel rods 26 comprises an elongated tube containing the fissionable fuel, in the form of pellets, particles, powder or the like, sealed in the tube by upper and lower end plugs 30 and 31. Lower end plugs 31 are formed with a taper for registration and support in support cavities 32 which are formed in the lower tie-plate 27. Upper end plugs 30 are formed with extensions 33 which register with support cavities 34 in the upper the plate 28.

Several of the support cavities 32 (for example, selected ones of the edge or peripheral cavities) in the lower tie-plate 27 are formed with threads to receive fuel rods having threaded lower end plugs 31. The extensions 33 of the upper end plugs 30 of these same fuel rods are elongated to pass through the cavities in upper tie-plate 28 and are formed with threads to receive internally threaded retaining nuts 35. In this manner, the upper and lower tie-plates and the fuel rods are formed into a unitary structure.

The fuel assembly 13 further includes a thin-walled tubular flow channel 36, of substantially square cross section, adapted to provide a sliding fit over the lower and upper tie plates 27 and 28 and the spacers 29 so that it readily may be mounted and removed. The channel 36 has a tab 37 welded to the top end which provides for fastening the channel to the fuel bundle with a bolt 38.

The lower tie-plate 27 is formed with a nose piece 41 adapted, as mentioned hereinbefore, to support the fuel assembly in a socket in the support plate 16 (FIG. 1). The end of the nose piece is formed with openings 39 to receive the pressurized coolant so that it flows upward among the fuel rods.

To avoid boiling of the coolant in the spaces 25 (FIG. 1) between the fuel assemblies, a portion (in the order of 5–6 percent) of the coolant flow into each fuel assembly is allowed to leak into the adjacent spaces 25 from between the lower tie-plate 27 and the channel 36 of the fuel assembly as indicated by the arrow legended LF in FIG. 2 to provide bypass flow among the channels.

This ends the general description taken from Venier et al U.S. Pat. No. 3,715,274.

Figure 13:
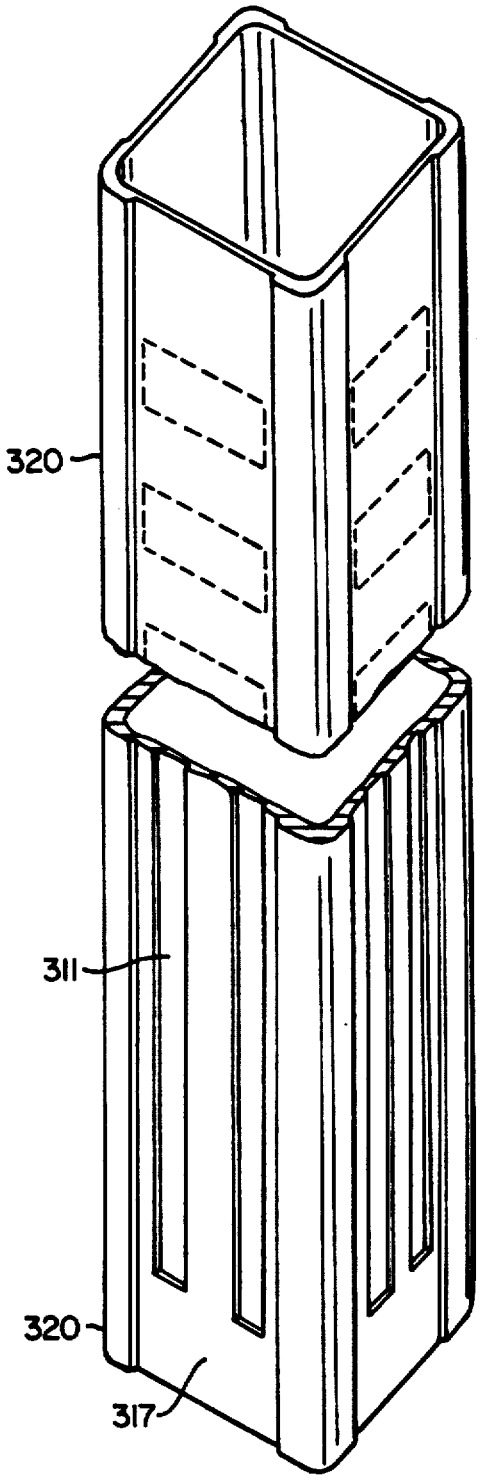
FIG. 13 is a perspective of a channel with thick corners and thin sides, with flow trippers in the upper portion and longitudinal grooves in the lower portion. This is the preferred embodiment. The tripper and groove dimensions can be chosen to obtain the desired axial variation in average wall thickness.

FIG. 2 shows the channel of Venier et al. U.S. Pat. No. 3,715,274 modified to incorporate the preferred embodiment of the invention. The preferred embodiment is illustrated in FIG. 13.

Figure 3:
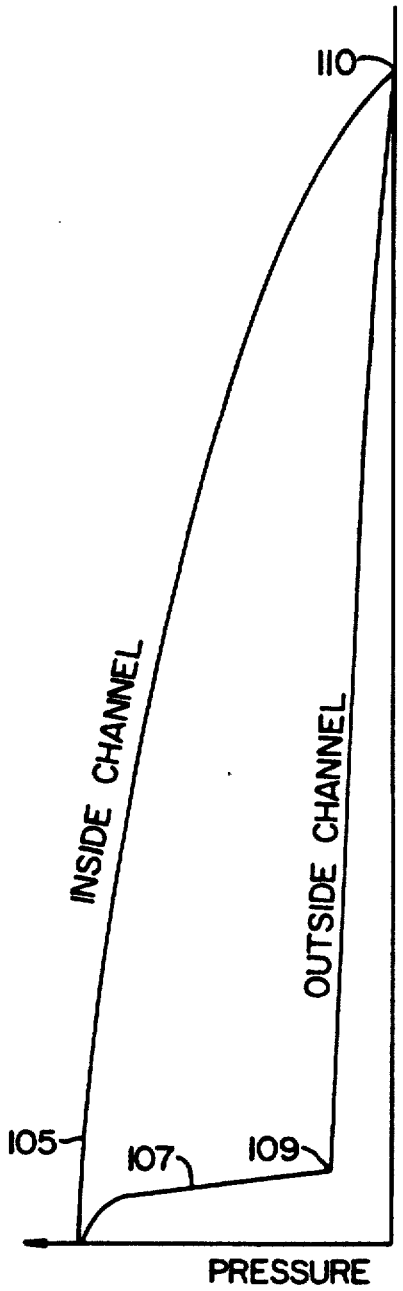
FIG. 3 is a pressure versus channel length diagram illustrating the tapering pressure differential between the inside and outside of the channel, correspondent to the tapering walls of the fuel channel.

Referring to FIG. 3, the pressure profile between the interior of a channel and the exterior of a channel is illustrated in graph format. The particular graph is in scale with the view shown in FIG. 2.

Interior of the channel, the pressure profile of water and fluid is shown by line 105. It can be seen that as fluid travels upward the length of the channel, the fluid loses its pressure. At the top or open portion of the channel it equilibrates. That is to say the pressure inside the channel and the pressure outside the channel become the same.

Referring to line 107, the pressure outside of the channel can be analyzed. Specifically, when water passes through the lower tie plate at the bottom of the channel, it is throttled and rapidly loses pressure. Pressure is lost to and towards a position 109. Thereafter, as the water travels upwardly, pressure is again lost. As the water reaches the top of the channels, equilibration occurs at 110.

Figure 4:
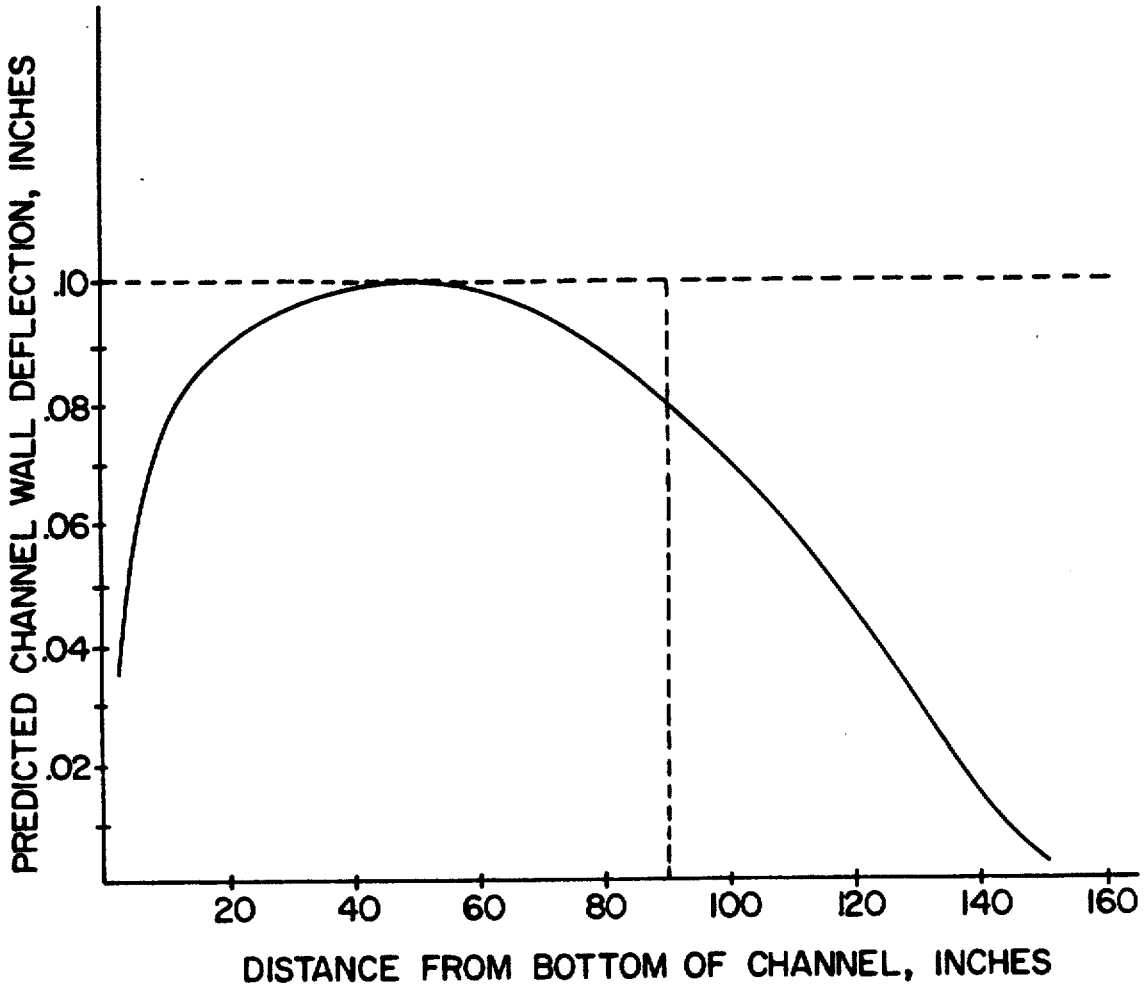
FIG. 4 is a bulge versus axial position diagram.

Referring to FIG. 4, the reader will remember that it has been previously pointed out that the flat side walls of the channels tend to bulge responsive to pressure.

This bulging may be predicted, again with respect to a uniformly thickened channel.

Specifically, referring to FIGS. 4 and 2 channel dimensioned 160 in length and 5.28 inches square having uniform side walls constructed of Zircaloy of 0.080 inches thickness, deflection is plotted. The reader can see that maximum deflection will occur in the range between 40 and 60 inches from the bottom of the channel. Thereafter, deflection rapidly tapers off to the full height of the channel at approximately 160 inches.

As has herein been set forth. We propose a tapered channel. Specifically, the channel tapers from a large cross section of wall thickness at the bottom to a small cross section of wall thickness at the top. Simply stated, only that thickness of material required to resist the forces along the entirety of the length of the channel is used. The taper of the channel could follow the bulge plot of FIG. 4, but for manufacturing simplicity and to provide good stability at the bottom, uniform thickness is used below the point of maximum bulge.

Those having familiarity with engineering design will realize that producing gradually tapered side wall sections is ofttimes a production difficulty. In order to simplify tapering of the channels here set forth, we disclosed the two specific tapered embodiments with respect to FIGS. 5 and 6.

Figure 5:
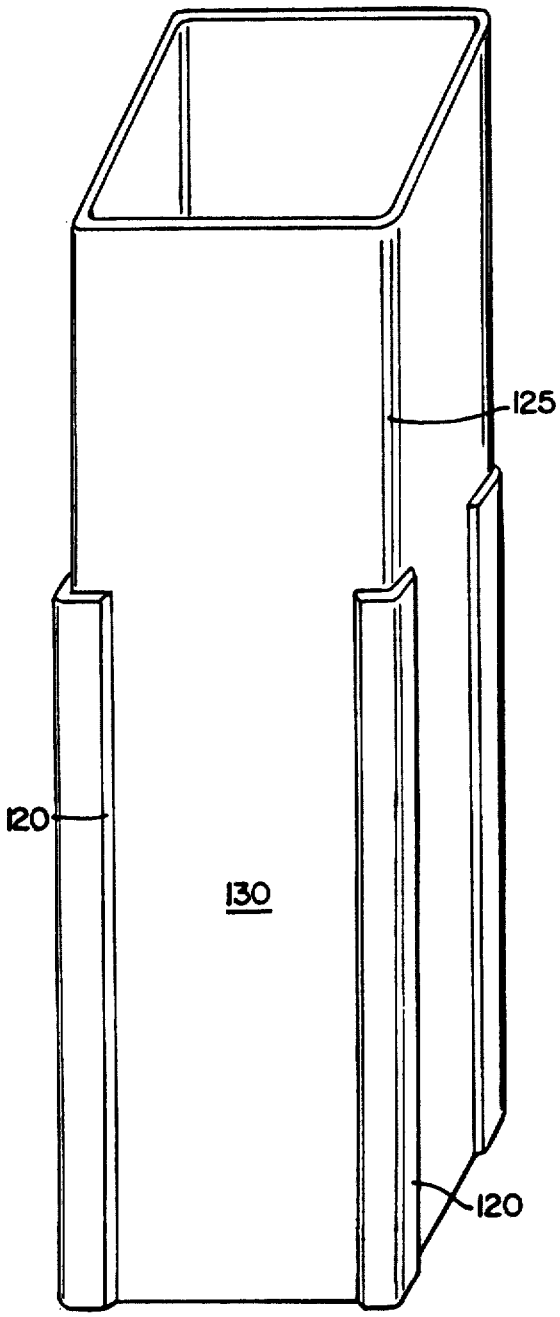
FIG. 5 is a perspective view of a channel having thickened corner sections at the lower end of the channel and narrow corner sections at the top end of the channel.

Referring to FIG. 5, a perspective view of a channel is shown. This channel includes thick corner sections 120 and thin side wall sections 130. It will be seen that corner sections 120 extend two-thirds the total height of the channel. These corner sections are roughly two-times the thickness of the side wall sections 130. The last one-third of the channel of FIG. 5 includes corner sections 125. These corner sections are the same thickness as the wall sections 130. Thus, the upper third of the channel of FIG. 5 is not reinforced.

It will be understood by the reader that other embodiments may work as well. Consider, for example, the construction of FIG. 6.

Figure 6:
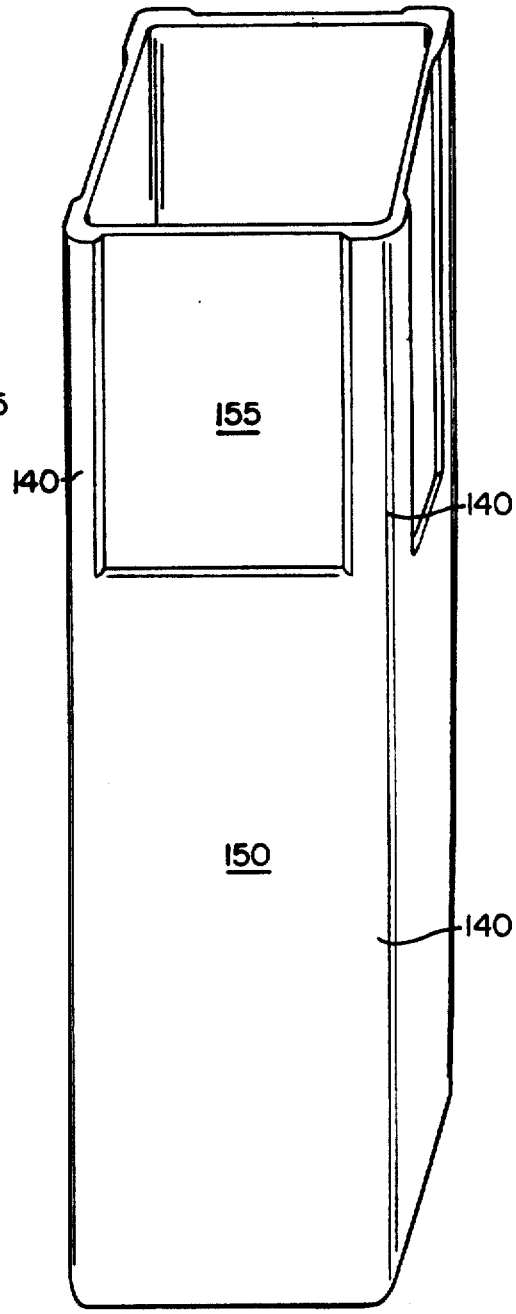
FIG. 6 is a perspective view of a channel having thinned side sections at the top end of the channel.

Referring to FIG. 6, a channel is again constructed of corner sections and wall sections. In the case of FIG. 6, corner sections 140 and wall sections 150 are of uniform thickness. That is to say, these sections covering the lower two-thirds of the channel have sufficient strength to withstand the greater pressure differential experienced at the bottom portion of the channel.

Wall section 155 at the top portion of the channel has reduced thickness. It has a thickness that is one-half that thickness utilized with respect to the bottom wall section 150.

It should be pointed out that thin wall section 155 is supported by the thick corners 140. This allows a substantial thinning of the section 155. The thinning at 155, in an alternate embodiment, could be incorporated in the inner wall of the channel to reduce pressure drop and improve coupled nuclear-thermal-hydraulic stability.

Figure 7:
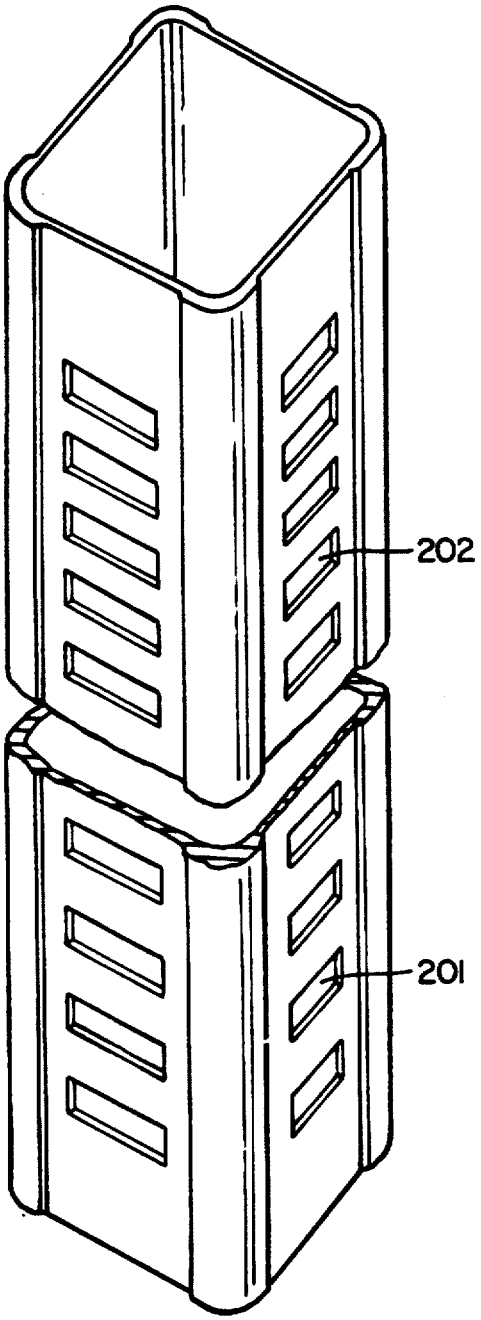
FIGS. 7 and 7A are perspectives of channels having transverse grooves in the sides, the embodiment here being illustrated with thick corners.

Referring to FIG. 7, an embodiment of the invention is illustrated having thick corners and thin sides, the thin sides having transverse grooves. The grooves 202 in the upper portion are more closely spaced than those 201 in the lower portion.

Figure 7A:
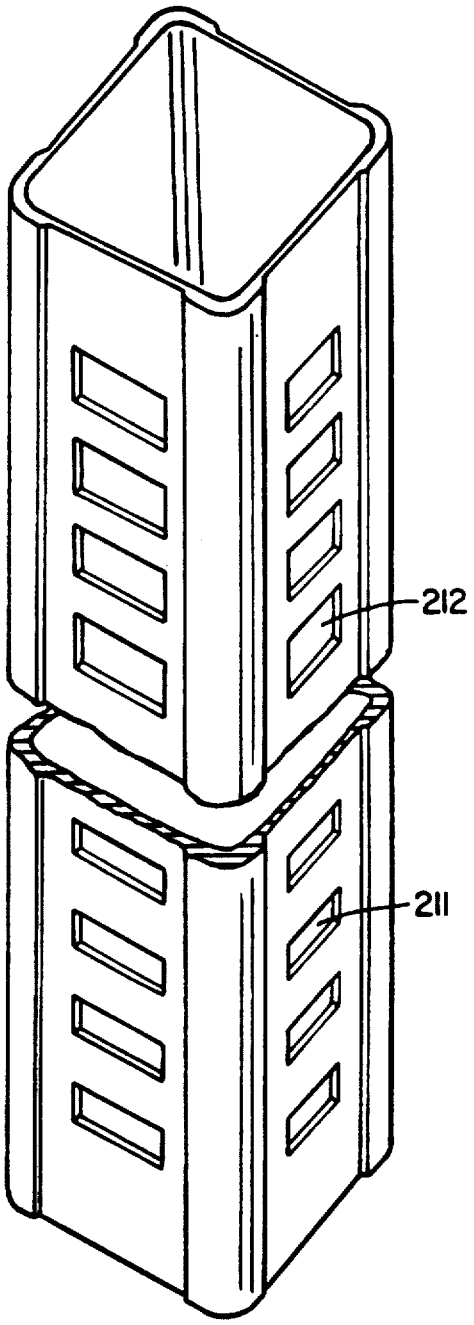

Referring to FIG. 7A an embodiment of the invention is illustrated, having thick corners and thin sides, the thin sides having transverse grooves. The grooves 212 in the upper portion are wider than the grooves 211 in the lower portion.

Figure 8:
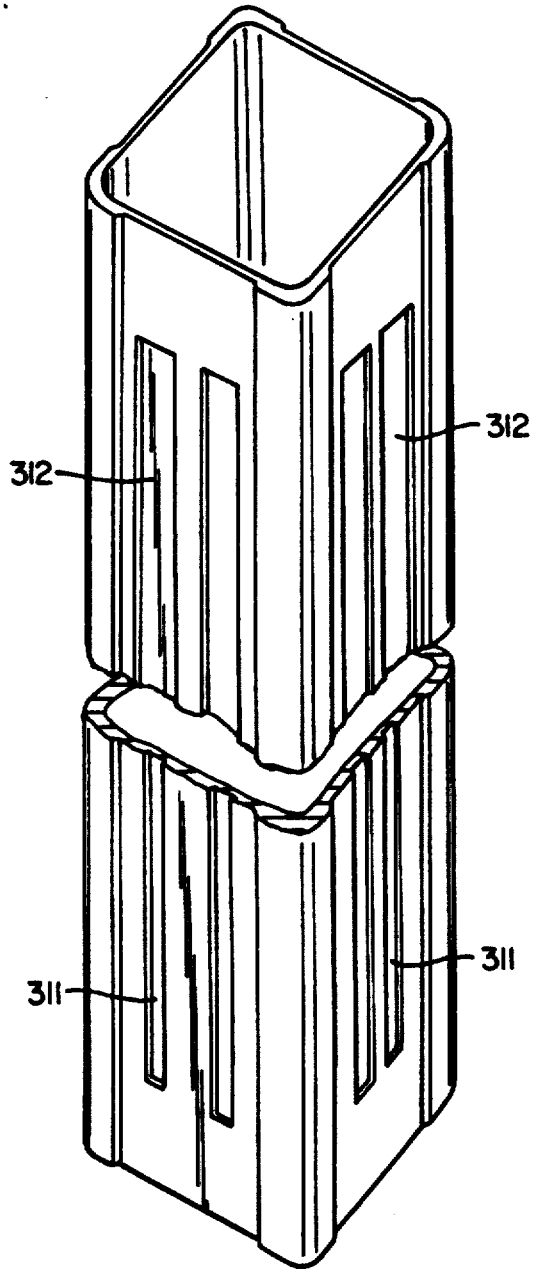
FIG. 8 is a perspective of a channel with longitudinal grooves in the sides, the embodiment here being illustrated with thick corners.

Referring to FIG. 8, an embodiment is illustrated having thick corners and thin sides, the thin sides having longitudinal grooves. The grooves 312 in the upper portion of the channel are wider than the grooves 311 in the lower portion.

Figure 9:
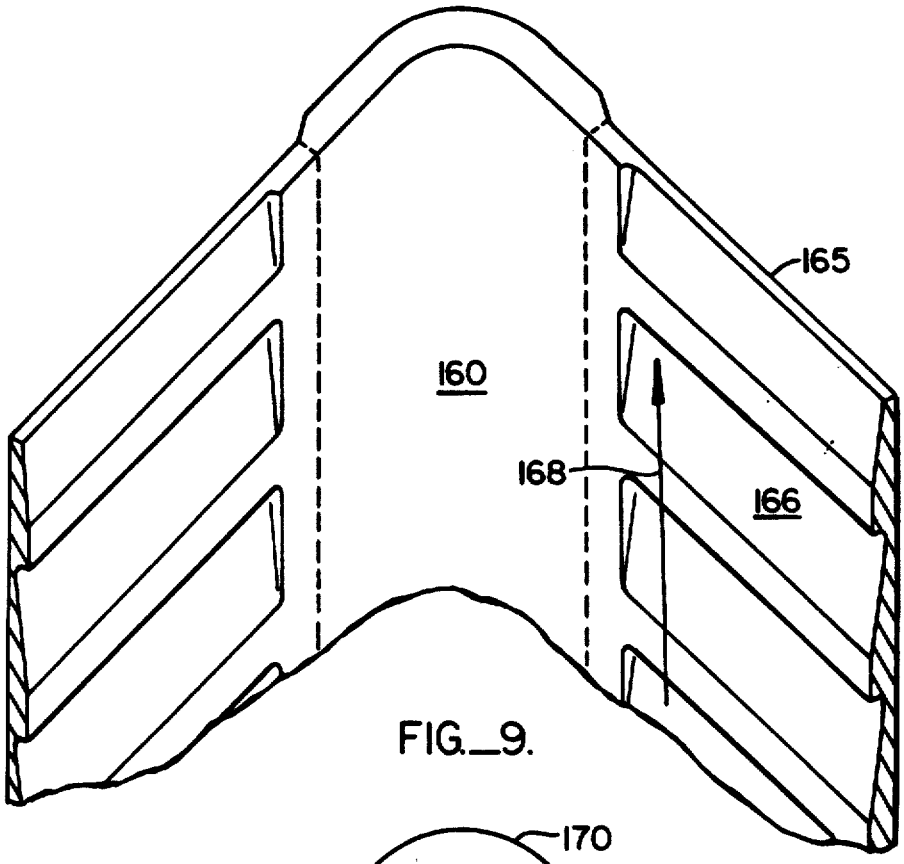
FIG. 9 is a perspective of a channel with internal grooves to provide flow trippers, the embodiment here being illustrated with thick corners.

Referring to FIG. 9, an embodiment of the invention is illustrated having a thick corner section 160 connected to wall sections 165. Wall sections 165 differ in their construction in that they incorporate flow trippers.

Specifically, it is known in the prior art to utilize flow trippers. Specifically, such flow trippers constitute irregularities or spoilers on the inner side wall of the channel. Such irregularities in the past have been transverse square protrusions on the inside of the channel, usually through added strips of metal. These added strips of metal deflect the water film flowing up the inside surface of the unheated channel and divert it to the neighboring heated fuel rods.

In this invention, the flow trippers are instead formed by cutting ramp shaped grooves in the inner surface of the channel, over the upper portion of the channel. The water layer flowing on the channel wall flows into the cut outs and is deflected towards the fuel rods at the upper edges of the cut-outs. The lower edges of the cut outs have a taper to allow the water layer to flow smoothly into the cut-outs. The taper is at an angle of less than 9° so that flow separation will not occur. The upper edges provide a sharp discontinuity in channel wall thickness which forces the water to move away from the channel wall. Some of this water deposits on the adjacent fuel rods, preventing transition from nucleate boiling and overheating of the fuel rods. Removal of material for the trippers also reduces neutron absorption in structural material and favorably increases the hydrogen-to-uranium ratio at the top of the reactor.

Referring to FIG. 9, it can be seen that wall 165 has been thinned. The wall thinned at 165 includes ramped indentations 166 therein. These indentations are transverse to the upward flow of water along direction 168. Simply stated, the top edge of the ramps, 166 deflect water from the inside edge 168 off of the channel wall and towards the fuel rods contained within the channel.

The reader will appreciate that several synergistic results are here obtained. First, flow trippers are utilized to increase thermal or transition boiling performance.

Second, and just as important, the flow trippers are incorporated in the upper third of the channel walls. They are incorporated where they are most needed to reduce pressure drop and increase the moderator-to-fuel ratio. The reduced pressure drop improves coupled nuclear-thermal-hydraulic stability. The increased moderator-to-fuel ratio improves the steam void reactivity coefficient, transient performance, stability, axial power distributions and cold shutdown reactivity margins.

Figure 10:
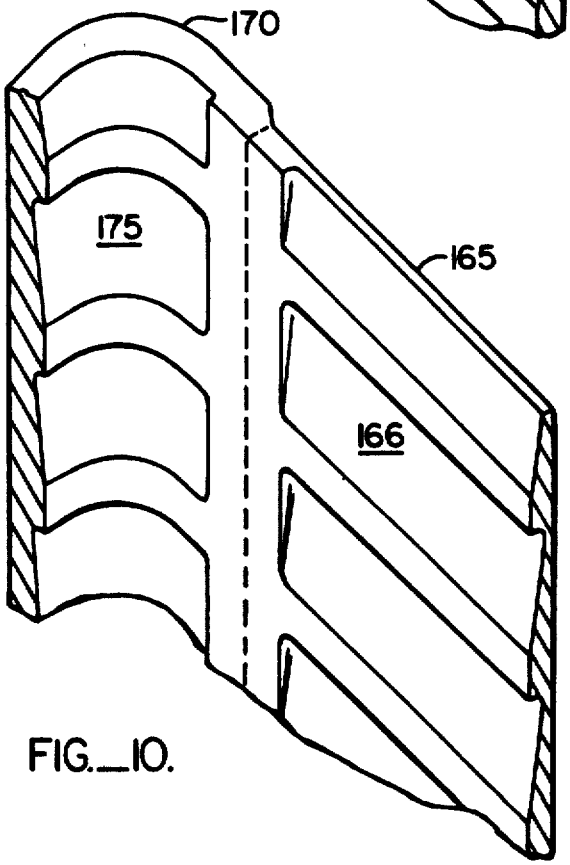
FIG. 10 is a channel similar to that shown in FIG. 3 having thick corners with flow trippers incorporated in the channel corner sections.

Referring to FIG. 10, an additional embodiment is illustrated. Specifically, a thickened corner section 170 is shown having internal flow trippers 175 incorporated in the corner section. Thus, in the embodiment shown, flow trippers are incorporated not only at 166 in side walls 165, but also in corner sections 170 at 175.

Referring to the flow tripper embodiment illustrated in FIGS. 9 and 10, the reader will understand that the flow trippers in the invention constitute an enlargement of the channel cross section at the location where the flow trippers are incorporated. Two advantages flow from this enlargement of the channel cross section at the top portion thereof.

First, and as will be remembered from the graph of FIG. 3, the upper portion of the channel constitutes that volume wherein the pressure drop inside the channel is the greatest. Specifically, the greatest pressure drop occurs in the upper part of the channel, where the ratio of steam volume to water volume is the greatest.

The channel designs of FIGS. 9 and 10 have the overall effect of enlarging the interior portion of the channel where this pressure drop occurs. This enlargement tends to lessen the localized pressure drop at the top of the channel.

Second, the interior of the channel in the area of the flow trippers incorporates a greater volume of moderating water.

By increasing the volume of moderating water in the upper part of the channel, where the ratio of steam volume to water volume is the greatest, a more uniform distribution of moderator is obtained. This gives a more efficient reactor design by flattening the axial power distribution, reducing the steam void reactivity coefficients and improving the cold shutdown reactivity margins.

Figure 11:
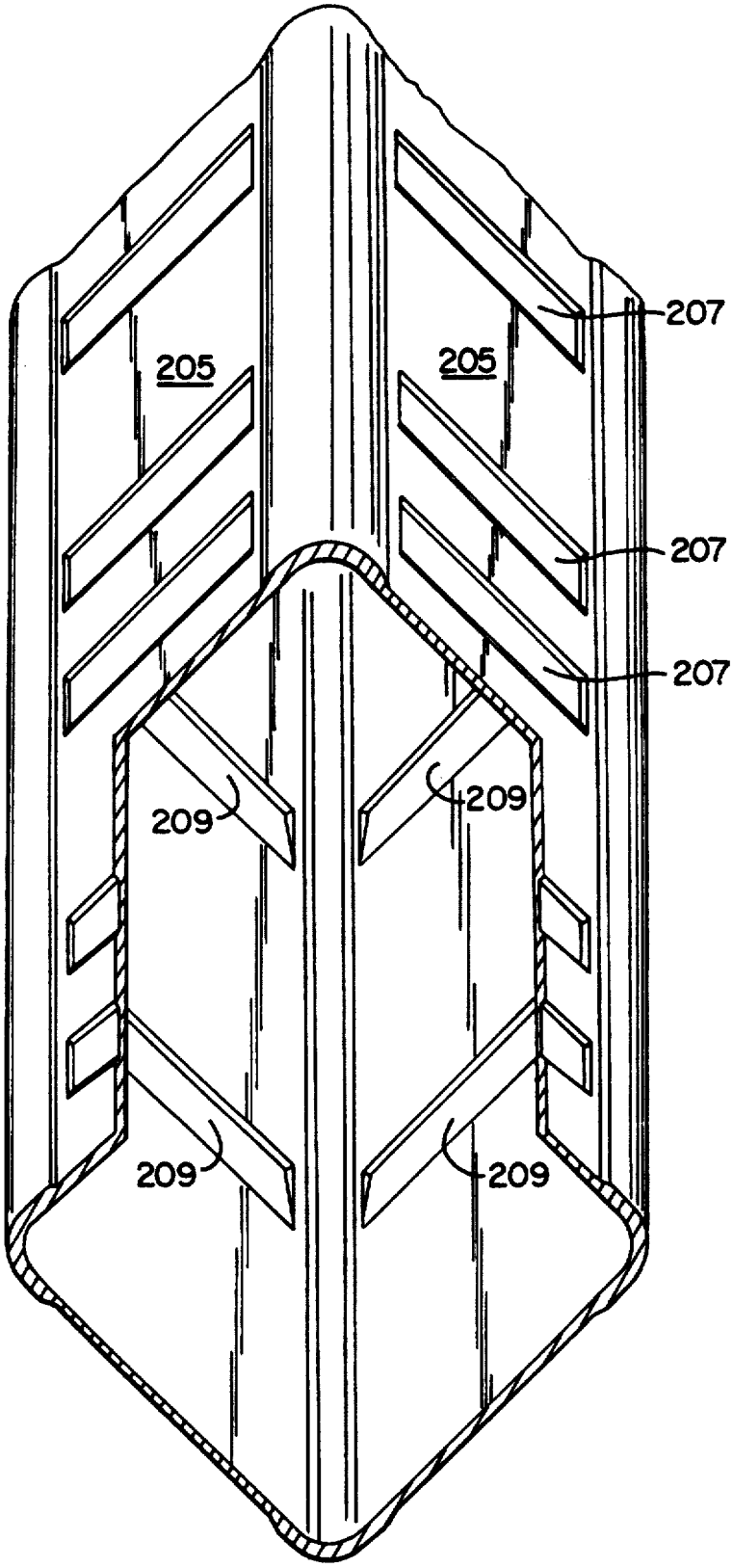
FIG. 11 is a section of a channel having sides of reduced thickness, with flow trippers on the inside of the channel and transverse grooves on the outside. The transverse grooves are located between the trippers. Short longitudinal grooves could also be used between flow trippers. Tripper and groove dimensions can be chosen to give an axial variation in average wall thickness.
Figure 12:
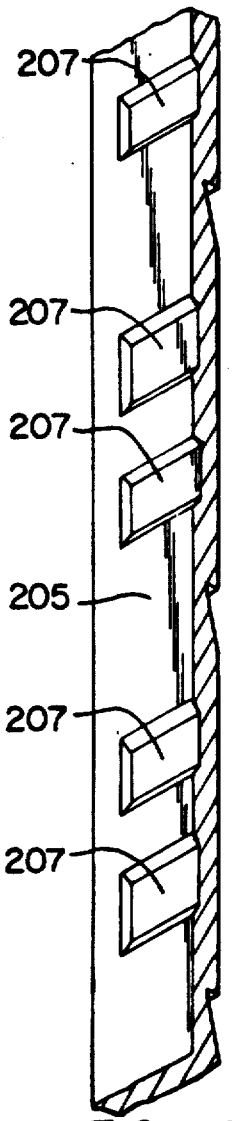
FIG. 12 is a plan view of a wall illustrating typical tripper and groove locations, with the grooves on the channel exterior.

Referring to FIGS. 11 and 12 an additional embodiment of the invention is disclosed. This embodiment includes thick corner sections 200 and intermediate wall sections 205.

Specifically, wall sections 205 include transverse grooves on the exterior surface as well as flow trippers on the interior surface.

Referring to FIG. 11, transverse grooves 207 are shown formed in the side wall on the exterior surface. Similarly, flow tripper sections 209 are shown configured on the side wall 205 at the interior portion thereof.

Referring to FIG. 12, the side wall utilized for the upper portion of the channel is shown. It is shown from the exterior side.

Referring back to FIG. 2, the channel 36 is shown with the preferred embodiment. The interior flow trippers 209 (shown in broken lines) occupy the upper one-quarter ($\frac{1}{4}$) to one-half ($\frac{1}{2}$) of the channel 36 only; flow trippers are not used in the lower three-quarters ($\frac{3}{4}$) to one-half ($\frac{1}{2}$) of channel 36. Longitudinal grooves 205 occupy the lower three-quarters ($\frac{3}{4}$) to one-half ($\frac{1}{2}$) of the channel. The length of the tripper and longitudinal groove sections can vary depending on the specific characteristics of the reactor in which the fuel bundle and channel are to be loaded.

It will appear to the reader that the tapered channel construction of this invention will admit of alternate embodiments.

Referring to FIG. 13, a perspective of the preferred embodiment is shown. Similar to FIG. 8, FIG. 13 discloses longitudinal outside grooves. These grooves are in thinned sidewall 317 and extend approximately one-half ($\frac{1}{2}$) to three-quarters ($\frac{3}{4}$) or 70–115 inches from the bottom portion of the channel. Flow trippers are used at the top of the channel above the longitudinal grooves.

Figure 14:
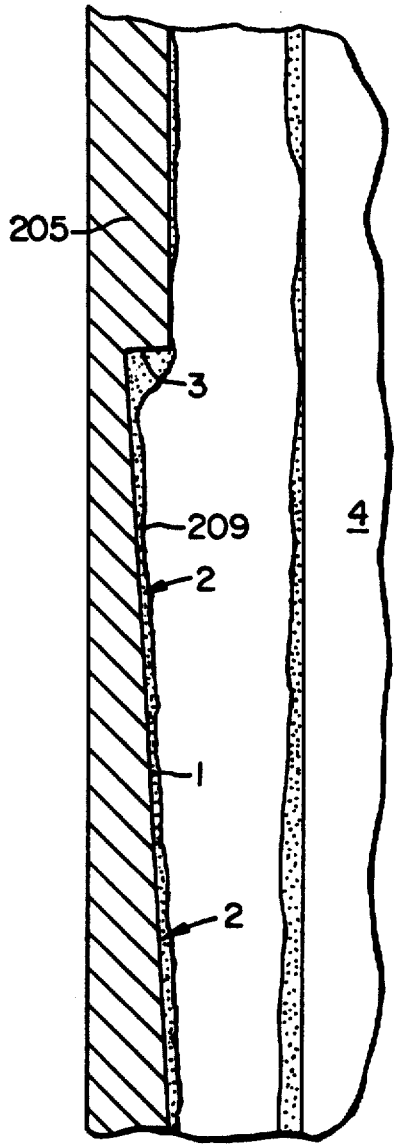
FIG. 14 is a cross section through the channel wall showing the preferred embodiment of the flow tripper geometry.

Referring to FIG. 14, a cross section through the channel wall is shown, together with adjacent fuel rods. The preferred embodiment of the flow tripper geometry is shown it being remembered that the flow trippers cover only the upper one-half to one-quarter of the length inside of the channel. The flow tripper is formed by making a tapered cut in the inner surface of the channel. The small taper angle 1 allows the liquid film to flow along the surface 2 without separation until the edge 3 is reached. At this location the liquid film is tripped, and directed towards the adjacent fuel rods 4.

Figure 14A:
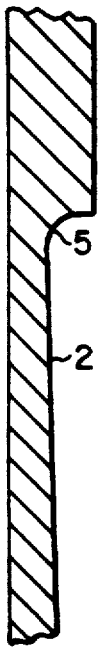
FIG. 14A shows an alternate embodiment.

As shown in FIG. 13, the surface 2 joins the edge 3 at an angle of approximately 90°. An alternate embodiment modifies this to connect the surface 2 to the edge 3 with a portion of a circular arc 5 as shown in FIG. 14a.

It will be appreciated that the flow trippers or grooves to the inside are only disposed over the upper one-quarter to one-half of the channel length. This gives the channel the overall taper in average thickness as well as disposing the flow trippers to function to divert water films flowing along the channel side walls at the top portion only.

The transverse grooves in an alternate embodiment are on the interior rather than the exterior of the channel and are confined to the bottom one-half to three-quarters of the channel length. This embodiment is shown in FIG. 9.

Figure 15:
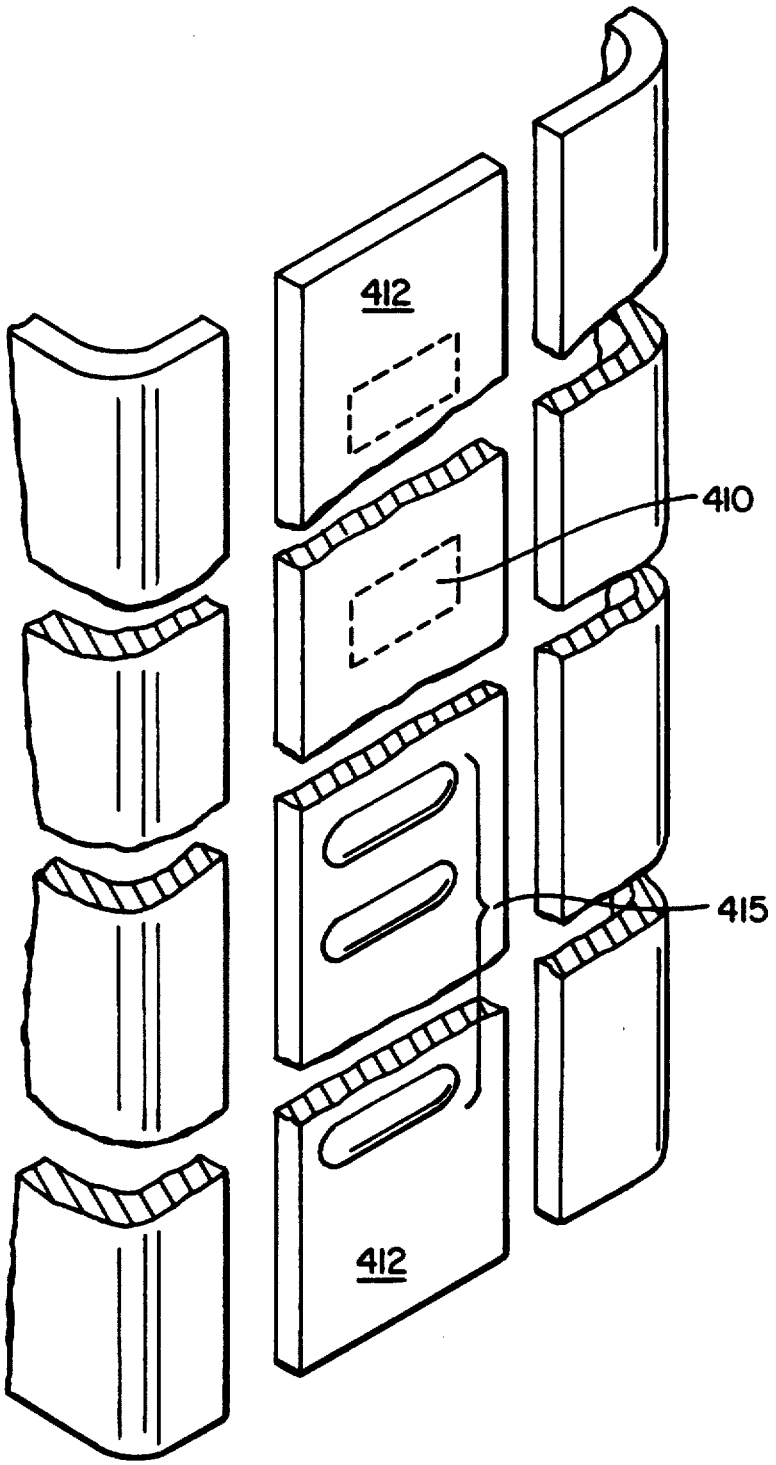
FIG. 15 is a partial perspective broken away illustrating the combined use of internal flow trippers on the upper one-third of the channel and corrugated sides on the lower two-thirds of the channel.

Referring to FIG. 15, thickened corners '400 extend the entire length of the channel. Sidewall 412 has the upper one-third of the channel including internal flow trippers 410. This same sidewall 412 has the lower one-half to three-quarters of the sidewall including corrugations 415. Such corrugations are more fully set forth and discussed in our copending U.S. patent application entitled Thin Wall Channel filed concurrently herewith as Ser. No. 029,509 filed 3/24/78 now U.S. Pat. No. 4,749,544 issued 6/7/88.

What is claimed is:

1. A fuel assembly comprising a plurality of fuel rods positioned in spaced array by upper and lower tie-plates, an open ended flow channel surrounding said array for conducting coolant upward between a lower support plate having coolant communicated thereto to an upper support grid having a steam/water outlet communicated thereto, said flow channel surrounding said array for conducting coolant about said fuel rods; said open ended channel having a polygon shaped cross section with said channel constituting a closed conduit with flat side sections connected at corners to form said enclosed conduit; means separate from said channel for connecting said upper and lower tie-plates together and maintaining said fuel rods in spaced array independent of said flow channel, the improvement in said flow channel comprising tapered side walls, said tapered side walls extending from an average thick cross section adjacent said lower support plate to an average thin cross section adjacent said upper core grid whereby said channel is reduced in thickness adjacent said upper core grid to correspond with the reduced pressure adjacent said upper core grid.

2. The invention of claim 1 and wherein said channel includes an increased cross section for coolant flow at the upper end of said channel.

3. The invention of claim 1 and wherein said channel includes transverse grooves in its sides, said grooves being wider and/or more closely spaced in the upper part of the channel.

4. The invention of claim 1 and wherein said channel includes longitudinal grooves in its sides, said grooves being wider and/or deeper in the upper part of the channel.

5. The invention of claim 1 including corner sections to said channels, said corner sections being thicker than said side wall sections.

6. A fuel assembly comprising a plurality of fuel rods positioned in spaced array by upper and lower tie-plates, an open ended flow channel surrounding said array for conducting coolant upward between a lower support plate having coolant communicated thereto to an upper support grid having a steam/water outlet communicated thereto, said flow channel surrounding said array for conducting coolant about said fuel rod; said open ended channel having a polygon shaped cross section with said channel constituting a closed conduit with flat side sections connected at corners to form said enclosed conduit; means separate from said channel for connecting said upper and lower tie-plates together and maintaining said fuel rods in spaced array independent of said flow channel, the improvement in said flow channel comprising transverse grooves acting as flow trippers on the interior walls of said channel to trip water flow from a path adjacent the said side walls of said channel to and towards said fuel rods.

7. The invention of claim 6 and including transverse or longitudinal grooves between flow trippers.

8. The invention of claim 6 wherein the flow trippers are confined to the upper portion of the channel and including transverse or longitudinal grooves in the lower portion of the channel.

9. The invention of claim 6 and including corner sections to said channels, said corner sections being thicker than said side sections.

10. The invention of claim 6 and including corrugated side walls in the lower portion of said channel.

*11. The invention of claim 6 and including ramp shaped grooves configured in the inner surface of said channel over the upper portion of said channel, said grooves commencing from a large cross section of wall thickness at the bottom to smaller cross section of wall thickness at the top.*

*12. The invention of claim 6 and wherein the lower edges of said grooves have a taper to allow the water layer to flow smoothly along the wall of said channel and into said grooves.*

*13. The invention of claim 12 and wherein the taper is at an angle of less than 9°.*

*14. The invention of claim 6 and wherein the upper edges of said groove provides a sharp discontinuity in said channel wall thickness which forces water passing along said grooves to move away from the channel wall.*

* * * * *